United States Patent [19]
Lusztig

[11] 3,910,732
[45] Oct. 7, 1975

[54] GEROTOR PUMP OR MOTOR
[75] Inventor: Gavril T. Lusztig, Cranston, R.I.
[73] Assignee: Webster Electric Company, Inc., Racine, Wis.
[22] Filed: Aug. 19, 1974
[21] Appl. No.: 498,373

[52] U.S. Cl. .............................. 418/60; 418/61 B
[51] Int. Cl.² ..... F01C 1/02; F03C 3/00; F04C 1/02
[58] Field of Search.......... 418/9, 58, 60, 61 B, 200, 418/210

[56] References Cited
UNITED STATES PATENTS
| 1,431,793 | 10/1922 | Hatcher | 418/60 |
| 3,106,163 | 10/1963 | Mosbacher | 418/60 |
| 3,463,090 | 8/1969 | Gordinier | 418/60 |

FOREIGN PATENTS OR APPLICATIONS
| 556,181 | 8/1932 | Germany | 418/61 B |

Primary Examiner—John J. Vrablik
Attorney, Agent, or Firm—Mason, Kolehmainen, Rathburn & Wyss

[57] ABSTRACT

A fluid pump or motor includes a casing having inlet and outlet ports and a shaft mounted in the casing for rotation about its longitudinal axis. A pair of gerotor assemblies are spaced apart axially on the shaft, each assembly including a star mounted for rotation with the shaft and having teeth or lobes meshing with internal lobes on the inside of a ring mounted for orbital movement around the shaft. The meshing lobes of the star and ring members form a plurality of expanding and collapsing fluid chambers spaced radially around the shaft at axially spaced locations. Passages communicate between expanding fluid chambers and one of the ports and between collapsing fluid chambers and the other port. A drive link interconnects the rings to synchronize their movement and to insure that collapsing or expanding chambers of one gerotor assembly are phased on the opposite side of the shaft with respect to the collapsing or expanding chambers of the other gerotor assembly as the shaft rotates in said casing.

21 Claims, 9 Drawing Figures

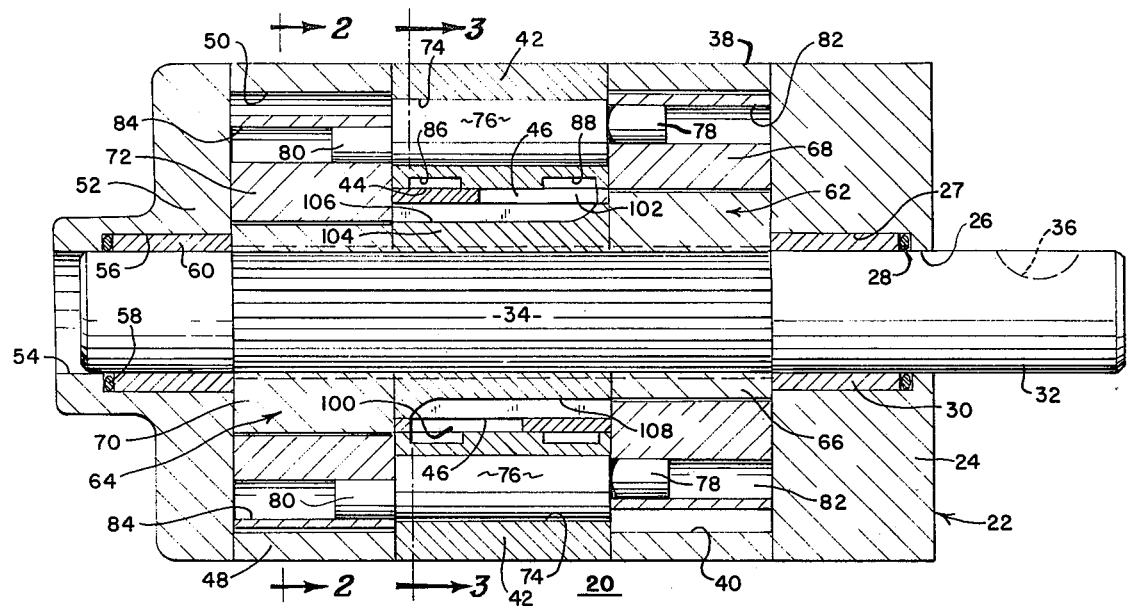
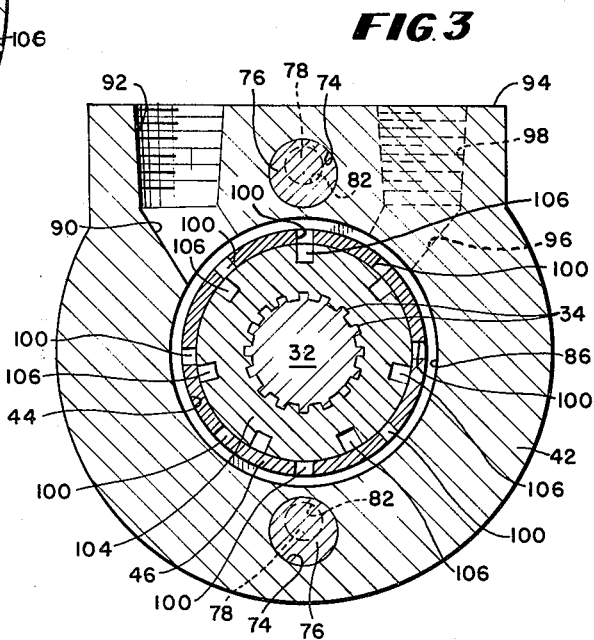

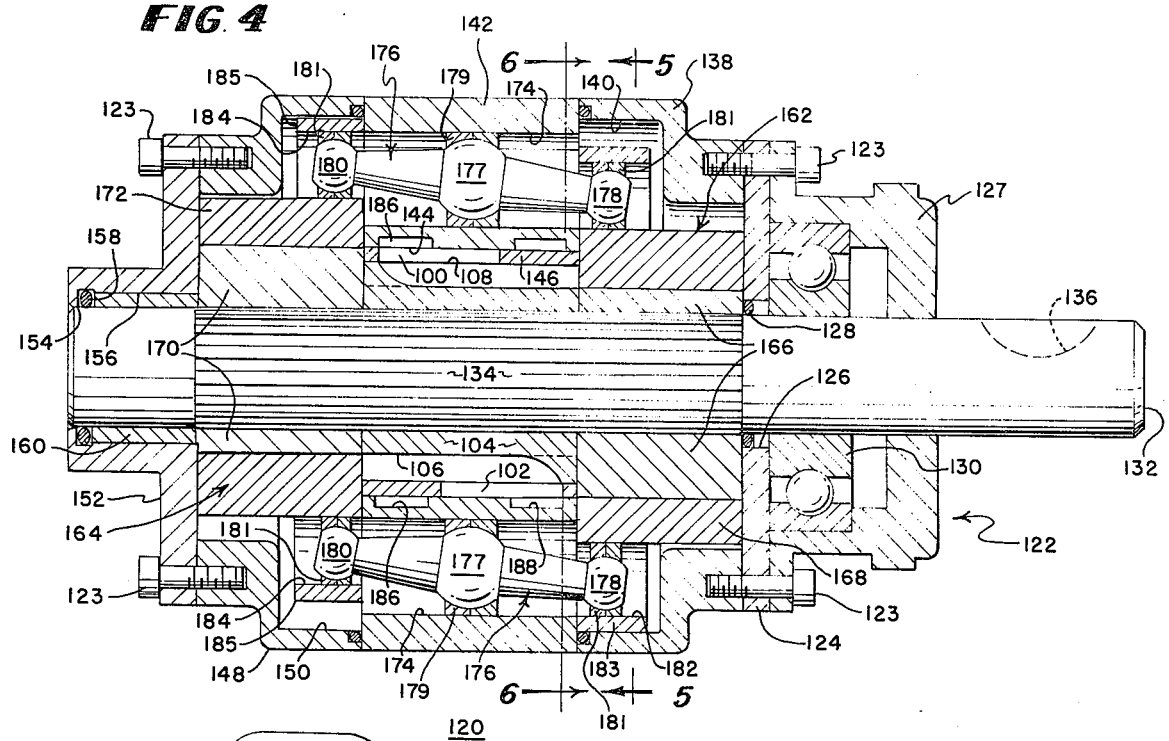
FIG. 4
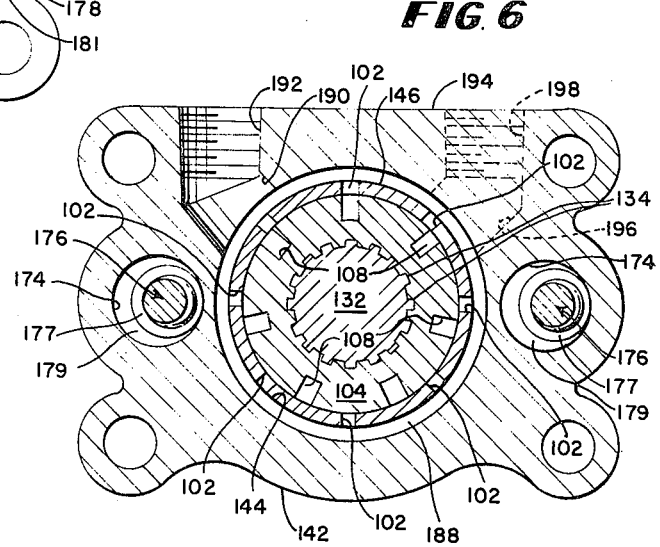
FIG. 5
FIG. 6

GEROTOR PUMP OR MOTOR

The present invention relates to fluid machines and more particularly to fluid pumps and motors of the type employing a pair of gerotor assemblies axially spaced apart on a common shaft.

In known gerotor machines of this type, a star or internal gear of a gerotor set is keyed to rotate with the shaft, and an outer ring or gear member of the gerotor is constrained against rotation and is mounted for orbital movement around the corresponding star to form an orbitally moving group of expanding and collapsing fluid chambers around the shaft. The present invention relates to improvements in structure provided for phase synchronizing the orbital movement of the rings of the respective gerotor assemblies of a multiple gerotor unit to balance the overall forces on the pump or motor, and to improvements in valving arrangements for intercommunicating the collapsing and expanding chambers to common outlet and inlet ports.

It is an object of the present invention to provide a new and improved fluid pump or motor of the character described.

Another object of the invention is to provide a new and improved fluid machine having a pair of axially spaced gerotor assemblies on a common shaft and means for maintaining phased synchronizing of the fluid chambers of the respective gerotor assemblies to provide overall balanced forces.

Another object of the present invention is to provide a new and improved fluid machine having novel fluid passage and valving arrangements for interconnecting expanding and collapsing chambers with the inlet and outlet ports so that relatively short, direct fluid passage connections are used, which passage connections can be formed with relatively uncomplicated machining operations thus reducing costs and avoiding restrictive fluid losses that are typical of prior art sturctures.

Another object of the present invention is to provide a new and improved fluid machine wherein fluid valving mechanisms are isolated from a load carrying responsibility thus eliminating many bearing problems with the valves such as are common in known devices.

Another object of the present invention is to provide a new and improved fluid machine having heavy duty main bearings located at opposite ends of the housing thereby minimizing bearing loads on the fluid working members and reducing the cantilever loading on an outward shaft projection.

Yet another object of the invention is to provide a new and improved fluid machine of the dual gerotor assembly type wherein the star of each gerotor is directly splined to rotate with a common shaft and the outer ring of each gerotor is constrained to orbit therearound, thereby eliminating universal link shafts or other fragile non-durable mechanical elements.

Still another object of the present invention is to provide a new and improved dual gerotor fluid machine wherein shaft reduction is provided to insure good low speed, high torque output or input characteristics.

The foregoing and other objects and advantages of the invention are accomplished in an embodiment of the invention comprising a new and improved fluid pump or motor having a casing with inlet and outlet ports and an elongated shaft mounted for rotation around its longitudinal axis. A pair of gerotor assemblies are spaced axially apart on said shaft within the casing, each assembly including a star splined to the shaft for rotation therewith and having external lobes or teeth meshing with internal lobes or teeth on the inside of a ring constrained against rotation and mounted for orbital movement in the casing around the star. The meshing lobes or teeth of the star and ring of each gerotor form a plurality of expanding and collapsing fluid chambers spaced radially around the common shaft. Valve passage means direct fluid communication between expanding and contracting fluid chambers and respective ports. Synchronizing drive link assemblies interconnect the rings of the respective gerotors for maintaining phased relation between the rings and thus between the expanding and collapsing sets of fluid chambers as the common shaft rotates in the casing.

For a better understanding of the present invention reference should be had to the following detailed description of the embodiments of the invention illustrated in the drawings, in which:

FIG. 1 is a longitudinal cross-sectional view of a new and improved fluid machine constructed in accordance with the features of the present invention;

FIG. 2 is a transverse cross-sectional view taken substantially along the line 2—2 of FIG. 1;

FIG. 3 is a transverse cross-sectional view taken substantially along the line 3—3 of FIG. 1;

FIG. 4 is a longitudinal cross-sectional view of another embodiment of a fluid machine constructed in accordance with the features of the present invention;

FIG. 5 is a transverse cross-sectional view taken substantially along the line 5—5 of FIG. 4;

FIG. 6 is a transverse cross-sectional view taken substantially along the line 6—6 of FIG. 4;

Figures 7, 8, 9:
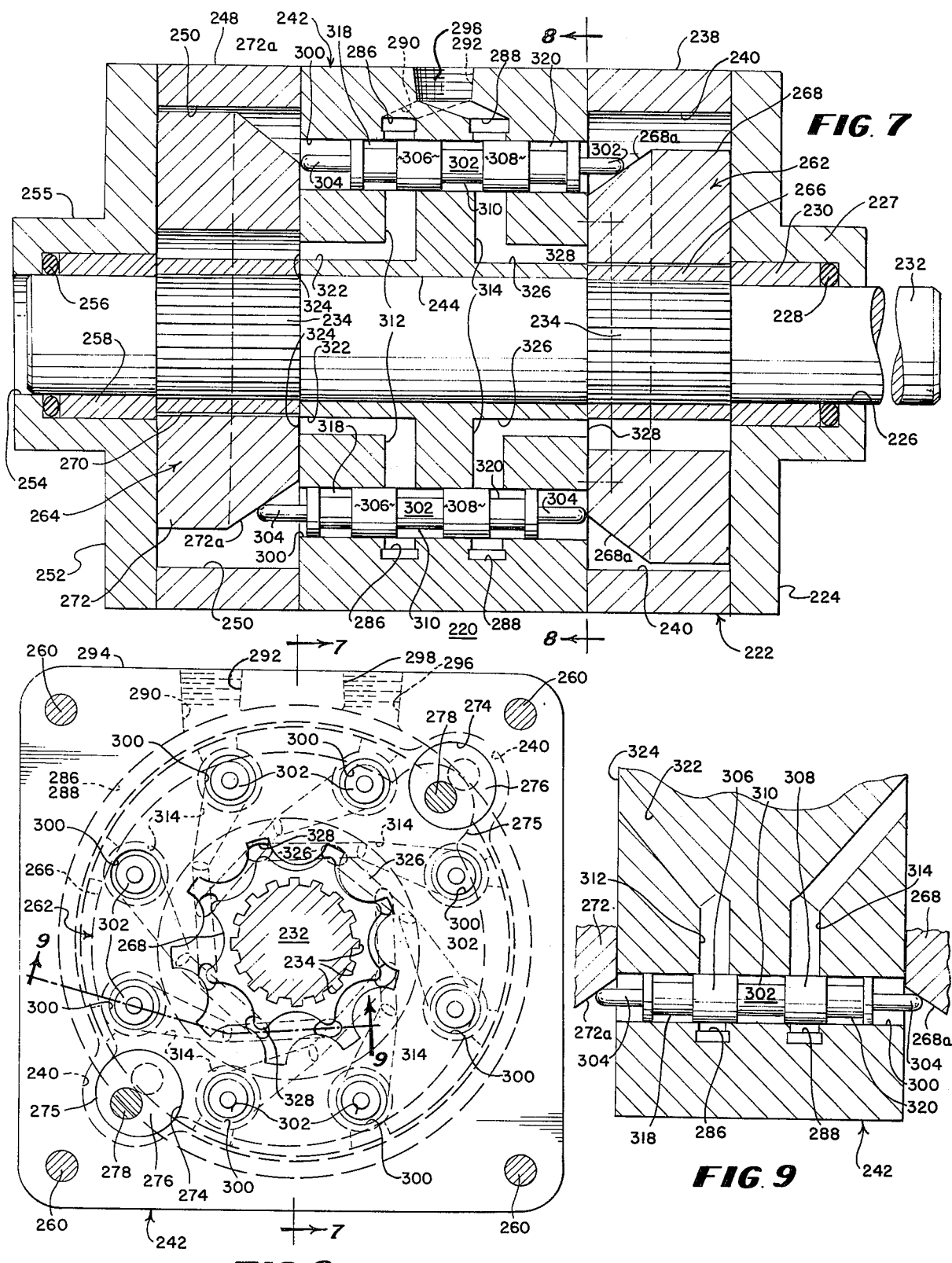
FIG. 7 is a longitudinal cross-sectional view of yet another embodiment of a fluid machine constructed in accordance with the features of the present invention.
FIG. 8 is a transverse cross-sectional view taken substantially along the line 8—8 of FIG. 7.
FIG. 9 is a fragmentary longitudinal cross-sectional view taken substantially along the line 9—9 of FIG. 8.

Referring now to the drawings, in FIGS. 1, 2 and 3 there is illustrated a new and improved fluid pump or motor constructed in accordance with the features of the present invention and referred to generally by the reference numeral 20. The machine 20 includes a segmented housing 22 having a mounting plate 24 at one end provided with a central bore 26 having an enlargement 27 for accommodating an annular seal 28 and a bearing 30. The bearing 30 supports an elongated rotor shaft 32 having a plurality of longitudinally extending splines 34 spaced intermediate the opposite ends of the rotor shaft. As illustrated in FIG. 1 the rotor shaft 32 projects outwardly from one end of the pump casing 22 (right hand end) and the shaft is formed with a key slot 36 or splines thereon for facilitating the driving connection with a gear or belt pulley (not shown). The mounting plate 24 is connected to a first annular spacing ring 38 defining an annular cylindrical gerotor cavity 40 spaced between the mounting plate and a central base plate or body 42. As best shown in FIG. 3 the central body 42 is formed with an axial bore 44 coaxially aligned with the rotor shaft 32 and within this bore is press fitted an annular, cylindrical outer valve sleeve 46 which is described in greater detail hereinafter.

The housing 22 includes a second annular spacing ring 48 which defines another annular cylindrical gerotor cavity 50 between the left hand face of the central body 42 and a left hand end cover plate 52. The end plate 52 is formed with a central bore 54 for accommodating the left hand end of the rotor shaft 32 and the bore is enlarged as at 56 to provide an annular housing for an annular seal ring 58 and a main shaft bearing 60. The mounting plate 24, first spacer ring 38, central body 42, second spacing ring 48, and cover end plate 52 are secured together to form the completed housing 22 of the pump or motor 20 with a plurality of elongated bolts or other suitable fastening means such as threaded stems (not shown) which extend parallel of the longitudinal axis of the main rotor shaft 32. Each of the housing segments 38, 42, and 48 is finished with precision to provide planar, smooth parallel end faces which are perpendicular or normal to the longitudinal axis of the rotor shaft when installed therein. The end plates 24 and 52 have planar inside end faces precision finished to fit against the end faces of the other housing segments.

The pump or motor 20 includes a first gerotor pair or assembly 62 mounted in the annular housing section 40 and spaced axially along the shaft 32 from a second gerotor pair or assembly 64 mounted in the housing section 50. Preferably the gerotor pairs are identical and the first gerotor 62 includes an inner star 66 having a plurality of radially spaced lobes or teeth and keyed onto the longitudinal splines 34 to rotate with the rotor shaft. A ring 68 having a plurality of lobes on its internal surface meshes with the lobes of the star 66 in the fashion customary with gerotor gears, which is to say that the mesh of the gear pair constrains the ring 68 to orbit in a circle about the star 66. To meet this condition of constraint the star carries one less lobe than does the ring. Similarly, the second gerotor 64 in the chamber 50 includes a star 70 splined onto the shaft 32 and an internally toothed outer ring 72. As shown in FIG. 2 the stars 66 and 70 of the present embodiment have seven lobes, while their mating rings 68 and 72 have eight lobes.

As is well known in the art of gerotor gears such a ratio of star to ring gear lobes results in seven full orbits of the ring to drive the star one full turn, thus producing seven times the torque at one-seventh of the speed of a conventional gear motor having a one-to-one gear ratio.

As best illustrated in FIG. 2, the stars 66 and 70 are keyed to the splines 34 of the rotor shaft 32 and rotate therewith. Consequently as the respective outer rings 68 and 72 orbit around the stars a pair of sets of expanding and collapsing fluid chambers are formed spaced radially around the rotor shaft at longitudinally spaced positions. Opposite side faces of the respective rings and stars of each gerotor are precision finished in parallel with a spacing therebetween dimensioned to provide a small working clearance with the adjacent side faces of the respective housing or chambers 40 and 50 in which the gerotors are mounted.

The stars 66 and 70 are rotationally displaced on the shaft by one half a tooth pitch so that the tooth of one star is positioned opposite a space between teeth on the other star as viewed in a direction extending axially parallel of the rotor shaft. While the respective stars 66 and 70 of the gerotors 62 and 64 are keyed to rotate with the common rotor shaft 32, the respective rings 68 and 72 must be constrained against rotation in the casing 22 and are constrained to orbital movement within the respective cavities around the shaft.

In accordance with a feature of the present invention, to provide this constraint and phase synchronize the orbital movement of the rings 68 and 72, the body plate 42 is provided with a pair of link pin bores 74 disposed outwardly of and parallel with the axis of the rotor shaft on diametrically opposite sides. Within each bore 74 there is provided a crank 76 having a cylindrical body and having a smaller diameter eccentric pin 78 at one end (right hand end) which is eccentric of the axis of the bore and spaced 180° in eccentricity with respect to a similar eccentric pin 80 at the opposite end of the crank. The eccentric pins 78 project into bores 82 formed in the ring 68 and spaced on diametrically opposite sides of the center axis thereof and the pins 80 extend into bores 84 formed in the ring 72 so that orbital movement of the rings 72 and 68 is in phased synchronism with the closed mesh point of the gerotor 62 180° out of phase with the closed mesh point of the gerotor 64. Accordingly, as shown in FIG. 2, if the uppermost tooth on the ring 72 is engaged in closed mesh with the uppermost space on the star 70 in the gerotor pair 64, on the opposite gerotor pair 62, the lowermost tooth of the ring 68 is in closed mesh engagement with the lowermost space between the teeth on the star 66. Since the orbit of gerotor pair 64 is 180° out of phase with the orbit of gerotor pair 62, there are fourteen power cycles for each output shaft rotation, leading to exceptionally smooth torque output.

In accordance with the present invention the machine is provided with a fluid passage and valve system mounted in the center plate or body 42 and adapted to direct fluid flow into and out of the expanding and collapsing fluid chambers of the pair of gerotors 62 and 64 which are axially spaced and interconnected on the common rotor shaft 32. For this purpose the central bore 44 is in communication with a pair of axially spaced outwardly extending annular grooves 86 and 88 formed in the body 42. The groove 86 is in communication with a passage 90 having an outer threaded end portion 92 opening onto a flatted surface 94 on the body and the groove 88 is in communication with a passage 96 having a threaded outer end portion 98 also opening onto the flatted surface so that the fluid supply and return lines external of the pump or motor 20 may be readily connected to the respective passages and grooves 86 and 88. The valve sleeve 46 is formed preferably of metal and is press fitted into the bore 44. The sleeve includes a first set of longitudinally extending radially spaced apart slots 100 in communication with the groove 86 and a second set of alternately spaced slots 102 in communication with the annular groove 88 in the central body 42. The slots 100 and 102 in each set are radially spaced apart from one another by an equal angular distance and there are slots in each set equal in number to the number of teeth in the rings 68 and 72, namely eight in the illustrated structure.

In accordance with the invention the pump or motor 20 includes an inner valve sleeve 104 of cylindrical shape which is keyed to rotate with the shaft 32 on the splines 34. The inner sleeve has a cylindrical outer surface which rotates within the bore surface of the stationary outer sleeve 46. A first set of longitudinally extending, radially spaced slots 106 in the sleeve 104 connect the fluid chambers in the gerotor pair 64 alternately to the slots 100 and 102 and a second set of slots 108 connect the fluid chambers in the gerotor pair 62 alternately to the slots 100 and 102 as the inner valve sleeve rotates in the outer valve sleeve. Thus, the expanding or contracting fluid spaces are appropriately connected to the high pressure or low pressure ports. There is one less slot 106 (seven) in the set of slots in the inner sleeve than there is in the set of slots 102 communicating therewith so that a verneir action takes place as the inner sleeve 104 rotates within the outer sleeve 46. As the inner sleeve rotates each slot 106 and 108 therein moves into and out of direct communication with a slot 102 and 100 in the outer sleeve in a selected sequence or phase so that valving action takes place to sequentially interconnect the expanding volume fluid chambers of both gerotors 62 and 64 to one of the grooves 86 or 88 and at the same time the contracting volume fluid chambers are sequentially connected to the other of the grooves.

In a fluid motor operation, pressurized fluid is admitted via the passage 90, groove 86, slots 100 and 106 to the expanding fluid chambers of the gerotor pair 64, and through passage 90, groove 86, slots 102 and 108 to the expanding fluid chambers of gerotor pair 62, causing the star members 66 and 70 to drive the shaft in one direction. While this is occurring, fluid discharged from the contracting fluid chambers of gerotor pair 64 is being expelled through slots 106 and 102 to groove 88 and channel 96, and that from gerotor pair 62 is being expelled through slots 108, slots 100 or 102, groove 86 and channel 96. Also, fluid discharged from contracting fluid chambers of gerotor pair 62 is expelled through slots 108, slots 100 or 102, groove 86 and passage 90. Reversing circuit connections to 90 and 96 brings about reverse shaft rotation. The rings 68 and 72 are constrained to phased orbital movement about the stars 66 and 70 and in each gerotor there is a set of collapsing and expanding fluid chambers as the point of closed mesh moves around the gerotor pairs.

In motor operation, the high pressure expanding fluid chambers in one gerotor exert an unbalanced force vector toward the low pressure contracting fluid chambers and this force vector rotates with the shaft as the chambers are filled and exhausted in sequence. The force vector of one gerotor is 180° out of phase with the vector of the other gerotor and these force vectors are thus balanced out or reduced to a net of zero because of the crank pin interconnection between the rings 68 and 72 of the gerotors.

In a pump operation, the contracting fluid chambers of the gerotors produce high pressure output fluid and the expanding fluid chambers would be supplied with incoming fluid through the passages and valving system as described and in either a pump or a motor operation, a reversal of the high and low pressure fluid passage 90 and 96 would result in or require a reversal of the direction of shaft rotation. Again, the phased interconnection of the rings through the crank pins 76 provides a force balanced pump operation as well as a motor operation with the pump or motor 20 of the present invention.

Referring to FIGS. 4, 5 and 6 there is illustrated another embodiment of a new and improved fluid pump or motor constructed in accordance with the features of the present invention and referred to generally by the reference numeral 120. The machine 120 includes a segmented housing 122 having a mounting plate 124 adjacent one end provided with a central bore 126 and an enlarged cup-like housing segment 127 for accommodating a ball bearing assembly 130. The ball bearing assembly 130 supports an elongated rotor shaft 132 having a plurality of longitudinally extending splines 134 spaced intermediate the opposite ends of the rotor shaft. As illustrated in FIG. 4 the rotor shaft projects outwardly from one end of the pump casing 122 (right hand end) and the shaft is formed with a key slot 136 or splines thereon for facilitating the driving connection with a gear or belt pulley (not shown). A seal ring 128 is provided in the base 126 to seal around the shaft. The mounting plate 124 is connected to a first annular spacing member 138 defining a gerotor cavity 140 spaced between the mounting plate and a central base plate or body 142. As best shown in FIG. 6 the central body 142 is formed with an axial bore 144 coaxially aligned with the rotor shaft 132 and within this bore is press fitted an annular, cylindrical outer valve sleeve 146 which is described in greater detail hereinafter.

The housing 122 includes a second annular spacing ring 148 which defines a second gerotor cacity 150 between the left hand face of the central body 142 and a left hand end cover plate 152. The end plate 152 is formed with a central bore 154 for accommodating the left hand end of the rotor shaft 132 and the bore is enlarged as at 156 to provide an annular housing for an annular seal ring 158 and a main shaft bearing 160. The mounting plate 124, first spacer 138, central body 142, second spacer 148, bearing cover 127 and end plate 152 are secured together to form the completed housing 122 of the pump or motor 120 with a plurality of elongated bolts 123 or other suitable fastening means such as threaded stems (not shown) which extend parallel of the longitudinal axis of the main rotor shaft 132. Each of the housing segments 138, 142 and 148 is finished with precision to provide planar, smooth parallel end faces which are truly perpendicular or normal to the longitudinal axis of the rotor shaft when installed therein. The end plates 124 and 152 are bearing cover 127 have planar inside end faces precision finished to fit against the end faces of the other housing segments.

The pump or motor 120 includes a first gerotor pair 162 mounted in the annular cavity 140 and spaced axially along the shaft 132 from a second gerotor pair 164 mounted in the housing cavity 150. Preferably the gerotor pairs are identical and the first gerotor pair 162 includes an inner star 166 having a plurality of radially spaced lobes or teeth and keyed onto the longitudinal splines 134 to rotate with the rotor shaft. The star 166 orbits within a ring 168 having a plurality of lobes on its internal surface meshing with the lobes of the star 166 in the fashion customary with gerotor gears, which is to say that the mesh of the gear pair constrains the ring 168 to orbit in a circle about the star 166. To meet this condition of constraint the star must carry one less lobe than does the ring. As shown in FIG. 5 the stars 166 and 170 of the present embodiment have seven lobes, while their mating rings 168 and 172 have eight lobes.

As is well known in the art of gerotor gears such a ratio of star to ring gear lobes results in seven full orbits of the ring to drive the star one full turn, thus producing seven times the torque at one-seventh of the speed of a conventional gear motor having a one-to-one ratio.

As best illustrated in FIG. 5, the stars 166 and 170 are keyed to the splines 134 of the rotor shaft 132 and rotate therewith and consequently orbit within the respective outer rings 168 and 172 thereby forming a pair of sets of expanding and collapsing fluid chambers spaced radially outwardly around the rotor shaft at longitudinally spaced positions. Opposite side faces of the respective rings and stars of each gerotor are precision finished in parallel with a spacing therebetween dimensioned to provide a small working clearance with the adjacent side faces of the respective cavities 140 and 150 in which the gerotors are mounted.

The stars 166 and 170 are rotationally displaced on the shaft by one half a tooth pitch so that the tooth of one star is positioned opposite a space between teeth on the other star as viewed in a direction extending axially parallel of the rotor shaft. While the respective stars 166 and 170 of the gerotors are keyed to rotate with the common shaft rotor 132, the respective rings 168 and 172 are constrained against rotation in the casing 122 and are constrained to orbital movement with the respective cavities 140 and 150 around the shaft.

In order to interconnect and phase synchronize the orbital movement of the rings 168 and 172, the body plate 142 is provided with a pair of wobble pin bores 174 disposed outwardly of and parallel with the axis of the rotor shaft on diametrically opposite sides as best shown in FIG. 6. Within each bore 174 there is mounted an elongated wobble pin 176 having spherically shaped bearing portion 177 at the center longitudinally thereof and a pair of smaller spherical bearing surfaces 178 and 180 formed adjacent the opposite outer ends of the wobble pin. The central spherical bearing portion 177 of each wobble pin is supported for wobbling movement in an annular bearing sleeve 179 formed in two rings and mounted in the bore 174 of the body plate 142. The rounded ends 178 of the wobble pins may be seated in bearing sleeves 181 mounted in a pair of diametrically opposite spaced apart bores 182 or may be seated directly in the bores which are formed in radial ears 183 of the ring 168 while the opposite rounded ends 180 are carried in similar bearing sleeves 181 mounted in bores 184 formed in radial ears 185 of the ring 172. The wobble pins 176 interconnect and synchronously phase the orbital movement of the rings 172 and 168 so that the closed mesh point of the gerotor 162 is 180° out of phase with the closed mesh point of the gerotor 164. Accordingly, if the uppermost tooth on the rings 172 is engaged in closed mesh with the uppermost space on the star 170 in the gerotor 164, on the opposite gerotor 162 the lowermost tooth of the ring 168 is in closed mesh engagement with the lowermost space between teeth on the star 166.

In accordance with the present invention the pump or motor 120 is provided with a fluid passage and valve system mounted in the center plate or body 142 and adapted to direct fluid flow into and out of the expanding and collapsing fluid chambers of the gerotor paairs 162 and 164 which are axially spaced and interconnected on the common rotor shaft 132. The fluid passage and valve system of the pump or motor 120 is identical to that of the prior embodiment and will not be described in detail herein. Similar reference numbers with the prefix 1 have been used for similar elements of structure.

In motor operation, the high pressure expanding fluid chambers in one gerotor exert an unbalanced force vector toward the low pressure contracting fluid chambers and this force vector rotates with the shaft as the chambers are filled and exhausted in sequence. The force vector of one gerotor is 180° out of phase with the vector of the other gerotor and these force vectors are thus balanced out or reduced to a net of zero because of the crank pin interconnection between the rings 168 and 172 of the gerotors.

In a pump operation, the contracting fluid chambers of the gerotors produce high pressure output fluid and the expanding fluid chambers would be supplied with incoming fluid through the passages and valving system as described and in either a pump or a motor operation, a reversal of the high and low pressure fluid passage 190 and 196 would result in or require a reversal of the direction of shaft rotation. Again, the phased interconnection of the rings through the wobble pins 176 provides a force balanced pump operation as well as a motor operation with the pump or motor 120 of the present invention. The wobble pins move in angular conical orbit with respect to the center of the central bearing surfaces 177 and thus the outer ends 178 and 180 are precisely 180° out of phase for interconnecting the stars 166 and 178 of the axially spaced gerotors 162 and 164.

Referring now to FIGS. 7, 8 and 9, therein is illustrated yet another embodiment of a new and improved fluid pump or motor constructed in accordance with the features of the present invention and generally referred to by the reference numeral 220. The pump or motor includes a segmented housing 222 having a mounting plate 224 adjacent one end provided with a central bore 226 and an enlarged cup-like housing segment 227 forming an enlarged bore section for accommodating an annular seal ring 228 and a bearing 230. The bearing 230 supports an elongated rotor shaft 232 having two sets of longitudinally extending, radially spaced splines 234, the sets being spaced apart longitudinally on the shaft intermediate the opposite ends. The right hand end of the shaft extends outwardly from the cup-like bearing housing 227 and is provided with an appropriate key slot or splines (not shown). The mounting plate 224 is connected to a first annular spacer 238 defining a gerotor cavity 240 provided between the mounting plate and a central body or base plate 242. The body or base plate 242 is provided with an axial bore 244 for accommodating a central unsplined section of the shaft 232. On the opposite side of the base member 242 there is provided a second spacer 248 similar to the spacer 238 and defining a second cavity 250 for a second gerotor carried on the common shaft. The spacer 242 is closed by an outer end plate 252 having an axial bore 254 defined therein and an enlarged cup-like housing section 255 for containing a seal ring 256 and a main shaft bearing 258 supporting the left hand end of the rotor shaft. As in prior embodiments, the mounting plate 244, spacers 238 and 248, base plate 242 and end plate 252 are secured together by elongated fasteners 260 to form the housing 222.

The machine 220 includes a first gerotor pair 262 mounted in the cavity 240 and spaced axially on the shaft 232 from a second gerotor pair 264 mounted in the cavity 250. The gerotor 262 includes a star 266 keyed onto the right hand (FIG. 7) splined section 234 of the shaft 232 and an outer ring 268 which is constrained for orbital movement around the star which rotates with the shaft. The gerotor 264 similarly includes a star 270 keyed onto the left hand splines 234 of the shaft for rotation therewith and an outer ring 272 which is constrained for orbital movement around the rotating star. As in the previous embodiments, the stars have one less tooth than the rings and are directly splined to rotate with the shaft while the outer rings of the gerotors are constrained against rotation but are permitted to orbit around the rotating stars. As best shown in FIG. 8, the rings 268 and 272 include radial ears 275 extending outwardly of the outer periphery thereof on diametrically opposite sides. The ears are interconnected with eccentric pins 278 provided on the opposite ends of crank members 276 journalled for rotation in a pair of bores 274 spaced on diametrically opposite sides of and parallel to the main central bore 244 in the base member 242. This linkage arrangement may be as described with reference to FIGS. 1–3, and is not further illustrated.

As in prior embodiments the stars 266 and 270 are keyed to rotate with the shaft 232 and are rotationally displaced from one another so that a tooth of one star is aligned with a space between teeth on the other star. Similarly the cranks 276 provide phased interconnection between the orbiting rings 268 and 272 so that the point of closed mesh between the expanding and contracting fluid chambers in each of the gerotors 262 and 264 are precisely 180° out of phase. The rings 268 and 272 are formed with a number of teeth, one greater than the number of teeth in the stars 266 and 270 so that the closed mesh point between the star and ring of each gerotor moves sequentially around as the shaft is rotated. The speed of star rotation in comparison to the speed of orbital movement is an 8 to 1 ratio, thus providing a low speed, high torque characteristic for input or output to or from the shaft of the pump or motor 220.

In accordance with the present invention, the machine 220 employs a novel system for valving the input and output of fluid to and from the expanding and collapsing sets of fluid chambers in the respective gerotors 262 and 264. For this purpose, the base member 242 is formed with a pair of axially spaced annular grooves 286 and 288 around the center bore 244 and the grooves are respectively connected through passages 290 and 296 open at the outer end on a flatted outer edge surface 294 of the base plate. The outer ends of the passages are provided with suitable threaded end portions 292 and 298 to facilitate external fluid connections to the machine.

The member 242 is formed with a plurality of longitudinal valve passages 300 extending between opposite faces of the base plate and parallel with the axial bore 244. The passages are spaced radially outwardly thereof in symmetrical array around the shaft 232 as shown in FIG. 8, and there is one fewer passage than there are tooth spaces in the rings 268 and 272. A spool valve 302 is mounted within each of the passages for longitudinal sliding movement therein to control the flow of fluid to and from the expanding and collapsing chambers of the gerotor and the annular grooves 286 and 288. Each spool valve 302 is provided with a pair of operator pins 304 at opposite ends having rounded outer ends adapted to cammingly engage a frustroconical cam surface 268a or 272a on one of the respective rings 268 and 272 of the gerotors. The spool valves include a pair of spaced apart lands 306 and 308 separated by an annular groove 310 formed by a reduced diameter stem portion on the valve spool. As best shown in FIG. 9, when a valve 302 is in a centered or neutral position in its respective passage, the lands 306 and 308 are in a flow blocking position with respect to both of the grooves 286 and 288 so that fluid flow into or out of the respective grooves and the collapsing or expanding fluid chambers of the gerotors is cut off.

As the rings 268 and 272 of the gerotors orbit in phased synchronism with one another, each valve 302 in sequence is moved in a reciprocating cycle from the neutral position of FIG. 9 to an outward position displaced to the right as shown in the upper valve of FIG. 7 and is then returned in a leftward direction past the neutral position to an outward position fully displaced to the left position as indicated by the lower valve in FIG. 7. To complete a cycle the valve spool is then returned toward the right to the neutral or starting position ready for the next cycle.

All of the valve passages 300 are in direct communication with the annular fluid grooves 286 and 288 through ports on the outside of the passages at longitudinally spaced apart locations on opposite sides of the longitudinal center of the passages directly opposite the grooves 286 and 288. On the inside, the valve passages 300 are intersected by inwardly extending frustroconical passages 312 and 314 opposite the outer grooves. With the valve spool 302 in the neutral position as shown in FIG. 9, no fluid flow takes place between the annular groove 286 and the inwardly directed passages 312 and similarly the valve passage 300 is blocked by the valve land 308 to cut off the fluid flow between the groove 288 and the inwardly directed passages 314. When the valve spools 302 are displaced from the neutral position as shown in FIG. 7, fluid flow commences and increases to a maximum between the grooves and passages through the central groove 310 in the valve spool or through outboard grooves 318 or 320 spaced outwardly of the respective lands 306 and 308. The inner ends of the left hand set of passages 312 aligned with the groove 286 are in communication with smaller diameter, angular intersecting passages 322 which terminate in elliptical ports 324 on the left hand face of the base plate 242 as viewed in FIG. 7. Fluid flow into or out of the expanding or collapsing fluid chambers of the gerotor 264 passes through the ports 324, passages 322 and 312 into the valve passages 300 and groove 286. Similarly the inner ends of the inwardly directed passages 314 are in communication with smaller diameter, angularly intersecting passages 326 which terminate in elliptically shaped ports 328 on the right hand face of the base plate 242.

From the foregoing it will be seen that as the shaft 232 rotates and the stars 266 and 270 carried thereby rotate within the orbitally constrained rings 268 and 272 of the respective gerotor 262 and 264, fluid from the expanding sets of fluid chambers in the gerotor is valved via the set of valves 302 to one of the grooves 286 while fluid from the collapsing fluid chambers is valved via the valves 302 to the grooves 288. The rings 268 and 272 of the respective gerotors control the reciprocal position of the valves 302 by the camming engagement of the surfaces 268a and 272a with the valve stems 304 to sequentially control the fluid flow for pump or motor operation as the case may be.

Referring to FIG. 8 it will be noted that the ports 328 are displaced approximately 90° out of phase with the valve passages 300 which control the fluid flow through the ports so that a rotational displacement of a fluid pressure resultant force vector developed in the gerotor is 90° ahead or behind the position of a ring in its orbital cycle. This lag (or lead) matches the natural behavior of the cam surfaces 268a and 272a on the gerotor rings to the valve plunger action. The eccentricity of the outer rings relate to the tight and loose mesh points of the gerotor pairs so the high point of the cams coincide with the open meshed teeth of the gerotor pairs and the portion of the tooth cycle where the maximum fluid must be exchanged is 90° away.

As the present invention has been described by reference to several embodiments thereof, it will be apparent that numerous other modifications and embodiments may be devised by those skilled in the art which will fall within the true spirit and scope of the invention.

What is claimed and desired to be secured by Letters Patent of the United States is:

1. A fluid pump or motor comprising: a casing having inlet and outlet ports; a shaft mounted in said casing for rotation about its longitudinal axis; a pair of assemblies axially spaced apart on said shaft, each assembly including an inner member mounted for rotation with said shaft having external gear means meshing with internal gear means on the inside of an outer member mounted for orbital movement on said casing, means including said gear means forming a plurality of fluid chambers surrounding said shaft; passage means in communication between a first group of said chambers and one of said ports and between a second group of said chambers and the other of said ports; and drive link means mounted on said casing and interconnecting said outer members to maintain said outer members in a predetermined orbital phase relationship.

2. The fluid pump or motor of claim 1 wherein said drive link means includes a pair of wobble pins on opposite sides of said shaft supported intermediate their ends from said casing and having opposite outer ends engaging said outer members to orbit the same in synchronism with each other as said shaft rotates in said casing.

3. The fluid pump or motor of claim 1 wherein said drive link means comprises a pair of crank shafts mounted for rotation in said casing on opposite sides of said shaft, each crank shaft including a pair of eccentric spindles on opposite ends engaging said outer members to orbit the same in synchronism with each other as said shaft rotates.

4. A fluid pump or motor comprising: a casing having inlet and outlet ports; a shaft mounted in said casing for rotation about its longitudinal axis; a pair of gerotor assemblies axially spaced apart on said shaft, each assembly including a star member mounted for rotation with said shaft having external lobes meshing with lobes on the inside of a ring member mounted for orbital movement on said casing, said meshing lobes forming a plurality of expanding and collapsing fluid chambers around said shaft; passage means in communication between expanding fluid chambers and one of said ports and between collapsing chambers and the other of said ports; and drive link means mounted on said casing and interconnecting said ring members to maintain said collapsing chambers of one gerotor assembly on the opposite side of said shaft from the collapsing chambers of the other gerotor assembly as said shaft rotates in said casing.

5. The fluid pump or motor of claim 1 wherein said drive link means includes a pair of wobble pins on opposite sides of said shaft supported intermediate their ends from said casing and having opposite outer ends engaging said ring members to orbit the same in synchronism with each other as said shaft rotates in said casing.

6. The fluid pump or motor of claim 1 wherein said drive link means comprises a pair of crank shafts mounted for rotation in said casing on opposite sides of said shaft, each crank shaft including a pair of eccentric spindles on opposite ends engaging said ring members to orbit the same in synchronism with each other as said shaft rotates.

7. The fluid pump or motor of claim 1 wherein said passage means includes valve means disposed between said spaced gerotor assemblies for directing fluid between said chambers of said ports.

8. The fluid pump or motor of claim 7 wherein said valve means includes an annular valve bushing mounted on said shaft including a plurality of longitudinal passages spaced apart, alternate ones of said passages in communication with fluid chambers adjacent opposite ends of said sleeve.

9. The fluid pump or motor of claim 8 wherein said passages in said bushing have one end opening onto an end of said sleeve and an opposite end thereof spaced longitudinally inward from an opposite end of said sleeve.

10. The fluid pump or motor of claim 9 wherein alternate passages have their opposite ends terminating along a pair of longitudinally spaced apart rings around said sleeve spaced inwardly of the opposite ends thereof.

11. The fluid pump or motor of claim 10 wherein said passage means includes a pair of annular grooves in said casing around said valve sleeve, each groove in communication with passages terminating along one of said rings and one of said ports.

12. The fluid pump or motor of claim 11 including a fixed annular sleeve mounted in said casing between said grooves and said valve bushing, said sleeve having a first set of ports in communication with one of said grooves and a set of said passages terminating along one of said rings and a second set of ports in communication with the other of said grooves and a set of said passages terminating along the other of said rings.

13. A fluid pump or motor comprising: a casing having inlet and outlet ports; a shaft mounted in said casing for rotation about its longitudinal axis; a pair of gerotor assemblies axially spaced apart on said shaft, each assembly including a star member mounted for rotation with said shaft having external lobes meshing with lobes on the inside of a ring member mounted for orbital movement on said casing, said meshing lobes forming a plurality of expanding and collapsing fluid chambers around said shaft; passage means in communication between expanding fluid chambers and one of said ports and between collapsing chambers and the other of said ports; said passage means including at least one valve passage extending between said gerotor assemblies, a valve slidably disposed in said valve passage for controlling fluid flow into and out of said gerotor assemblies and operatively interconnected with said ring members for movement in response to the relative orbital position thereof; and drive link means mounted on said casing and interconnecting said ring members to maintain said collapsing chambers of one gerotor assembly on the opposite side of said shaft from the collapsing chambers of the other gerotor assembly as said shaft rotates in said casing.

14. The fluid pump or motor of claim 10 wherein said passage means includes a pair of sub-passages each having one end in communication with said valve passage at spaced locations thereon and an opposite end in communication with a fluid chamber of one of said gerotor assemblies at a position angularly spaced around said shaft from said valve passage.

15. The fluid pump or motor of claim 14 including a pair of annular fluid channels around said shaft and spaced apart axially of said valve passage and in communication therewith on a side opposite said one end of said sub-passages, said valve including means normally blocking communication between said channels and an opposite sub-passage when said valve is in a neutral position and opening communication therebetween when moved out of said neutral position.

16. The fluid pump or motor of claim 14 wherein said opposite end of said sub-passages comprise wall ports formed in said casing adjacent the end of a fluid chamber formed between a star and ring member of a gerotor assembly.

17. The fluid pump or motor of claim 16 wherein one of said wall ports is angularly spaced around said shaft from the other of said wall ports.

18. The fluid pump or motor of claim 17 wherein said wall ports are spaced 90° from said valve passage.

19. The fluid pump or motor of claim 13 wherein said valve includes a pair of actuating stems projecting outwardly at opposite ends, said ring members including beveled cam surfaces thereon engaging said stems for reciprocating said valve in said valve passage as said ring members orbit around said star members.

20. The fluid pump or motor of claim 19 including a plurality of said valve passages parallel of said shaft and equally angularly spaced apart therearound, each of said passages having open opposite ends facing said cam surfaces on said ring members, one of said valves in each of said valve passages activated by said cam surfaces and a pair of said sub-passages for each of said valve passages for communication with said fluid chambers of said gerotor assemblies.

21. The fluid pump or motor of claim 20 wherein said cam surfaces of said ring members are of frustroconical shape in opposed spaced apart relation axially of said shaft.

* * * * *